(12) United States Patent
Basu et al.

(10) Patent No.: US 8,694,562 B2
(45) Date of Patent: Apr. 8, 2014

(54) GENERATIONAL GARBAGE COLLECTION FOR A POOL-BASED HEAP

(75) Inventors: Abhinaba Basu, Redmond, WA (US); Jaiprakash Sharma, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/477,083

(22) Filed: May 22, 2012

(65) Prior Publication Data

US 2013/0318132 A1 Nov. 28, 2013

(51) Int. Cl.
*G06F 12/00* (2006.01)
*G06F 17/30* (2006.01)

(52) U.S. Cl.
USPC ........... 707/814; 707/816; 707/817; 707/819; 711/159; 711/165; 711/173; 711/209

(58) Field of Classification Search
USPC .......... 707/813, 814, 816, 817, 819; 711/159, 711/165, 173, 209
See application file for complete search history.

(56) References Cited

U.S. PATENT DOCUMENTS

| | | | |
|---|---|---|---|
| 6,286,016 B1 * | 9/2001 | Heller et al. ................. | 711/170 |
| 6,308,185 B1 | 10/2001 | Grarup et al. | |
| 6,526,422 B1 | 2/2003 | Flood et al. | |
| 6,567,905 B2 | 5/2003 | Otis | |
| 6,681,306 B1 * | 1/2004 | Kessler et al. ............... | 711/171 |
| 7,072,919 B2 * | 7/2006 | Sexton et al. .......... | 707/999.206 |
| 7,171,527 B2 * | 1/2007 | Pliss et al. ..................... | 711/153 |
| 7,197,521 B2 * | 3/2007 | Subramoney et al. . | 707/999.206 |
| 7,296,044 B1 * | 11/2007 | Pliss et al. .............. | 707/999.206 |
| 7,953,711 B2 | 5/2011 | Soman et al. | |
| 2002/0105523 A1 * | 8/2002 | Behrbaum et al. ............ | 345/543 |
| 2003/0033498 A1 * | 2/2003 | Borman et al. ................ | 711/206 |
| 2003/0093625 A1 * | 5/2003 | Beukema et al. ............. | 711/147 |
| 2003/0212719 A1 * | 11/2003 | Yasuda et al. ................. | 707/206 |
| 2003/0221022 A1 * | 11/2003 | Sexton et al. ................. | 709/321 |
| 2005/0278497 A1 * | 12/2005 | Pliss et al. ..................... | 711/170 |
| 2006/0059474 A1 * | 3/2006 | Bhansali et al. .............. | 717/151 |
| 2010/0138460 A1 * | 6/2010 | Ogasawara ................... | 707/813 |
| 2012/0272037 A1 * | 10/2012 | Bayer et al. .................. | 711/202 |
| 2012/0323979 A1 * | 12/2012 | Basu et al. .................... | 707/813 |

OTHER PUBLICATIONS

"Java HotSpot Garbage Collection", Retrieved at <<http://www.oracle.com/technetwork/java/javase/tech/g1-intro-jsp-135488.html>>, Aug. 21, 2010, pp. 02.

"Mono", Retrieved at <<http://mono-project.com/Generational_GC>>, Retrieved Date: Mar. 12, 2012, pp. 21.

Marlow, et al., "Parallel Generational-Copying Garbage Collection with a Block-Structured Heap", Retrieved at <<http://community.haskell.org/~simonmar/papers/parallel-gc.pdf, International Symposium on Memory Management (ISMM), Jun. 7, 2008, pp. 10.

\* cited by examiner

*Primary Examiner* — Phong Nguyen (74) *Attorney, Agent, or Firm* — Kevin Sullivan; Kate Drakos; Micky Minhas (57) ABSTRACT

A generational garbage collector utilizes a pool-based heap to store objects dynamically generated at runtime. The pool-based heap is configured as a collection of pools where each pool stores objects associated with the same generation. Each pool contains a pool header that identifies the generation of all objects within the pool. The pools are aligned to a memory boundary that is a multiple of the pool size. Select bits of an object's memory address may be used to access the pool header so that an object's generation, which is needed in various phases of the garbage collection process, is readily determined.

17 Claims, 10 Drawing Sheets

GENERATIONAL GARBAGE COLLECTION FOR A POOL-BASED HEAP

BACKGROUND

Garbage collection is the reclamation of unused memory space used to store objects dynamically allocated at runtime. The objects may represent variables, data structures, classes, object types, and other types of data that are stored in a heap. A garbage collector scans the objects in the heap and marks those objects that are 'live' and still in use by a program. The garbage collector then reclaims the memory space of the unmarked objects which are presumed to be 'dead' or garbage.

A generational or ephemeral garage collector may be used to boost the performance of the garbage collection process by marking only the recently allocated objects. A generational garage collector relies on the assumption that most dynamically-allocated objects die young and that collecting recently allocated objects will probably reclaim more unused memory space. For this reason, a generational garbage collector segregates the heap into two or more generations.

A younger generation stores newly allocated objects and an older generation stores objects that are considered 'live.' Objects in the older generation are often not collected by the garbage collector. Objects from the younger generation are processed by the garbage collector and promoted to the older generation after the garbage collector has marked them as being 'live.' The 'live' objects from the younger generation are then copied into the older generation's memory space. Each generation typically consumes a contiguous address space so copying objects from the younger generation's memory space into the older generation's memory space burdens the computational overhead of the generational garbage collection. Furthermore, the allocation of a contiguous address space creates fragmentation problems within the heap when objects are de-allocated.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A generational garbage collector uses a pool-based heap to store objects dynamically allocated by a managed application. The pool-based heap consists of multiple generations, where each generation forms a collection of pools and each pool stores one or more objects associated with the same generation. A younger generation consists of newly created objects that are more likely to die young. An older generation consists of objects that have survived one or more garbage collections. All objects stored in a pool are of the same generation. Each pool also has a header that indicates the pool's generation.

Each pool is aligned at a boundary that is a multiple of the pool's fixed size with the pool header stored at the boundary. In this manner, each pool is not constrained to a contiguous memory space. In addition, the memory address of a pool header can be easily calculated from certain bits of an object's memory address thereby allowing quick access to the pool header and hence, the object's generation. An object's generation is needed in several phases of the operation of the generational garbage collector. By aligning the pool header at the prescribed boundary, an object's generation can be readily determined thereby increasing the efficiency of the generational garbage collector.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments pertain to a generational garbage collection technology that utilizes a pool-based heap. A pool-based heap is a collection of pools, where each pool is used to store objects within the same generation. A pool is allocated when needed. As a pool is allocated, it is linked to other pools resulting in a sequence of pools forming a heap. In this manner, the heap is not constrained to a contiguous memory space. This alleviates fragmentation issues within the heap since a large contiguous portion of memory does not need to be allocated for the heap.

The size of a pool is fixed and each pool is aligned at a prescribed boundary in a memory area. Large objects, whose size exceeds the fixed pool size, are allocated in a contiguous pool which is aligned at the prescribed boundary. The alignment of a pool at a prescribed boundary results in the starting address of a pool being a multiple of the fixed pool size.

Each pool has a header that identifies the generation of all the objects in the pool as well as other information. The determination of an object's generation is easily determined by locating the object's pool header which is stored at the aligned boundary. This makes access to an object's pool header efficient since it does not rely on the use of another data structure, such as a brick table, to contain pointers to the memory location of each object. By storing a pool header at an aligned boundary, the memory address of the pool header may be found quickly using certain bits of an object's memory address. In this manner, less computational overhead is incurred in determining the generation of an object which is needed in several phases of the generational garbage collector.

A generational garbage collector performs a sequence of phases that may include a mark phase, a sweep phase, a compaction phase, and a promotion phase. In a mark phase, the generational garbage collector marks the objects, in the youngest generation, that are still used by the program. Next, in a sweep phase, the generational garbage collector reclaims the unmarked objects by placing the unused memory space into a free memory pool. In a compaction phase, the live objects are coalesced to the top or bottom of the managed heap to eliminate fragmentation. Compaction requires moving one or more objects to a particular area of the managed heap and to update all references to each object to reflect the new memory location.

The promotion phase advances the objects that survive a garbage collection to an older generation. Objects are typically promoted based on a tenure policy. For example, one such tenure policy may promote objects in generation n to generation n+1 once they have survived $x_n$ garbage collections, where x may be different for each generation n.

During a mark phase, the generational garbage collector scans for objects in an older generation that reference objects in a younger generation. A mechanism is needed to track which objects in the older generation reference objects in a younger generation since objects in the older generation may not be scanned. A write barrier program is used during the execution of a program to track the older generation objects that reference younger generation objects. The write barrier program may be invoked when a write operation is executed. However, the write barrier program needs to know the generation of the object under consideration which may be readily determined from accessing the object's pool header.

The write barrier program utilizes a card table to mark the starting address of a memory range storing the older generation object. Later, during the mark phase, the generational garbage collector consults the card table to obtain the starting address of the pool where the older generation object resides. The generational garbage collector then searches the pool for the older generation object by searching each object in the pool. Once the object is found, the generational garbage collector traces a link to the younger generation object which is then marked as being live.

In addition, the generational garbage collector "threads" a younger generation object to the older generation object by placing a link to the older generation object in the younger generation object's object header. Later, during the compaction phase, the younger generation object may be compacted and moved to another memory location. All references (e.g., links, pointers, etc.) to the younger generation object need to be updated to reflect the new memory location. The "threading" of the younger generation object to the older generation object during the mark phase eliminates the need to traverse the older generation pools to update any references to compacted objects in younger generation pools. Instead, updates to an older generation object may be performed during the compaction phase when the younger generation object is moved to a new memory location.

The use of a pool-based heap makes the promotion phase more efficient. Promotion of an object from a younger generation to an older generation may not involve copying the object into another memory space. In the case where the entire pool is to be promoted to the next generation, promotion is achieved by updating the generation flag of the pool header to reflect the older generation. Previously, promotion of an object required copying the object to be promoted into the older generation's address space.

Figure 1:
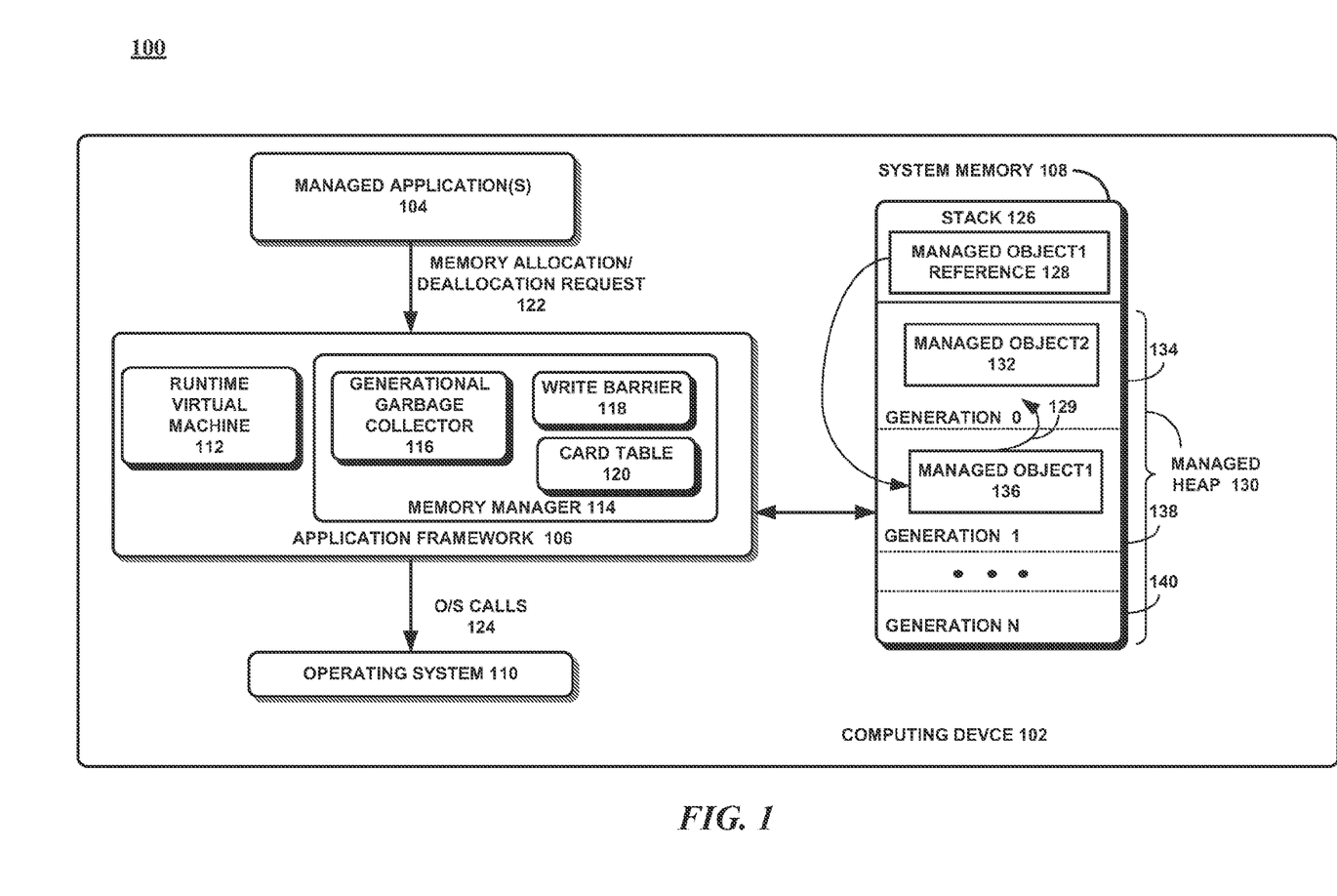
FIG. 1 illustrates an exemplary system utilizing a generational garbage collection for a pool-based heap.

Attention now turns to a discussion of an exemplary system that utilizes a generational garbage collector for a pool-based heap. Turning to FIG. 1, the system 100 may include a computing device 102. The computing device 102 may be any type of electronic device capable of executing programmable instructions. In several embodiments, the computing device 102 may be a mobile computing device, such as a smart phone. In other embodiments, the computing device 102 may be any type of electronic device capable of executing programmable instructions described below with respect to FIG. 10.

The computing device 102 may include one or more managed applications 104, an application framework 106, a system memory 108, and an operating system 110. A managed application 104 is a sequence of intermediate language computer instructions that may execute under the control of a runtime virtual machine 112. An application framework 106 is a set of software tools for creating and executing software programs, such as managed applications. In one or more embodiments, the application framework 106 may be a framework that supports a mobile application or another type of embedded environment supported by .NET, common language runtime (CLR), or similar technologies. In one or more embodiments, the application framework 106 may be a mobile application framework such as, without limitation, Silverlight®, available from Microsoft Corporation (Silverlight® is a registered trademark of the Microsoft Corporation in the United States and/or other countries). It should be noted that the technologies described herein are not constrained to any particular application framework, programming language, and/or operating system.

The application framework 106 may include a runtime virtual machine 112 and a memory manager 114. The runtime virtual machine 112 converts the intermediate language instructions of the managed application 104 into machine instructions which are executed. The runtime virtual machine 112 also services memory management requests during the program's execution through the memory manager 114.

The memory manager 114 controls the allocation of memory for each managed application 104. The memory manager 114 services the memory allocation and deallocation requests 122 made during execution of the managed application 104. In addition, the memory manager 114 performs garbage collection to reclaim unused memory space.

The memory manager 114 may include a generational garbage collector 116, a write barrier 118, and a card table 120. The generational garbage collector 116 reclaims unused memory space in the managed heap 130. A card table 120 is a collection of bits, where each bit represents the starting address within the managed heap 130. A write barrier 118 is a software program that bars access to a memory location until completion of a pending write operation. The write barrier 118 updates the card table 120 each time an older generation object is updated with a reference to a younger generation object. When garbage collection occurs, at a later point, the generational garbage collector 116 consults the card table 120 to see if there were any writes to an older generation object, thus allowing the younger generation object to be marked.

The system memory 108 may include a stack 126 and a managed heap 130. The stack 126 may be a portion of memory used by the managed application 104 as temporary storage to store the values of local variables, pointers, parameters, return addresses, etc. In essence, the stack 126 contains pointers to the objects stored in the managed heap 130. The managed heap 130 may be partitioned into several generations, Generation 0 to Generation N. For example, Generation 0 134 may store recently allocated objects that have not been processed by the generational garbage collector 116. Generation 1 138 may store objects having survived a predetermined number of garbage collections. Likewise, Generation N 140 may store the objects most frequently used by the managed application 104 and may have survived a predetermined number of garbage collections. However, it should be noted that the generations may be arranged in alternate configurations as desired for a particular implementation.

The stack 126 may include a reference to managed object 1, 128. Managed object 1, 128 may be stored in a pool associated with Generation 1, 138. Managed object 1, 128 may contain a reference 129 to managed object 2, 132 that is associated with Generation 0, 134.

The operating system 110 controls access to the various memory devices (e.g., hard disk drive, random access memory, etc.) associated with the computing device 102. The operating system ('O/S') may receive requests, in the form of ON calls 124, that relate to the allocation and deallocation of memory from the application framework 106. In a particular embodiment, the operating system 110 may be a Windows®, Windows® Phone or Windows® Mobile operating system (Windows® is a registered trademark of the Microsoft Corporation). However, it should be noted that the embodiments herein are not tied to any particular operating system and that other operating systems may be utilized.

The managed applications 104, operating system 110, runtime virtual machine 112, generational garbage collector 116 and the write barrier 118 may be a sequence of computer program instructions, that when executed by a processor, causes the processor to perform methods and/or operations in accordance with a prescribed task. The managed applications 104, operating system 110, runtime virtual machine 112, generational garbage collector 116 and write barrier 118 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Although the system 100 shown in FIG. 1 has a limited number of elements in a certain configuration, it should be appreciated that the system 100 can include more or less elements in alternate configurations.

Figure 2:
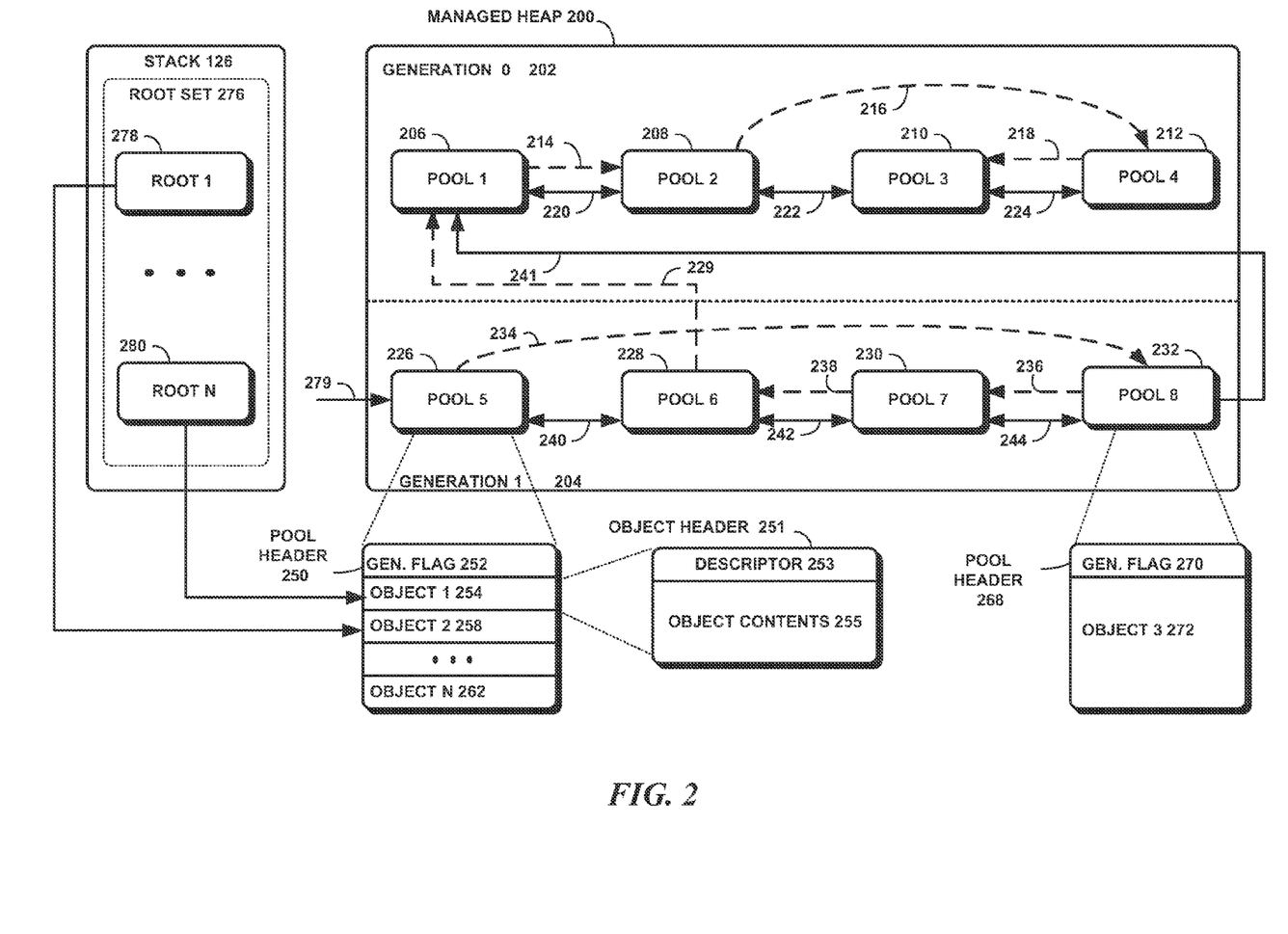
FIG. 2 is a block diagram illustrating an exemplary managed heap.

Attention now turns to a further discussion of the pool-based heap. Turning to FIG. 2, there is shown an exemplary managed heap 200 configured with two generations, Generation 0, 202 and Generation 1, 204. For illustration purposes, Generation 0 is considered the youngest generation and Generation 1 is considered the older generation. Each generation may be constructed as a sequence of pools that are connected through two link structures. A first link connects each pool in an increasing age order or seniority (i.e., age ordered list). The second link is a double link that connects each pool based on a sequential address order (i.e., address ordered list) which may be increasing or decreasing based on the direction that the link is traversed. Each generation is not constrained to a contiguous address space. In fact, each pool may be located in a different non-contiguous address space from the other pools.

As shown in FIG. 2, Generation 0 202 contains four pools: pool 1, 206; pool 2, 208; pool 3, 210; and pool 4, 212. A pool may have a first link that connects the pools in an age order (i.e., dashed line arrows 214, 216, 218) to form an age-ordered list and a second link that connects the pools in an address ordered list (i.e., solid line arrows 220, 222, 224) to form an address-ordered list. In the age ordered list, the pools are arranged in an order starting from the oldest pool to the youngest pool. The age ordered list may be a doubly-linked list that links each pool in ascending and descending age order thereby allowing traversal of the pools in both directions.

Generation 1 204 contains four pools: pool 5, 226; pool 6, 228; pool 7, 230; and pool 8, 232. A pool may have a first link that connects the pools in an age order (i.e., dashed line arrows 234, 236, 238) to form an age-ordered list and a second link that connects the pools in an address order (i.e., solid line arrows 240, 242, 244) to form an address-ordered list.

Each generation in the managed heap 200 is connected to each other. A pointer 279 points to the 'start' of the oldest generation pool (i.e., the oldest pool in the oldest generation). The pointer 279 may be utilized to traverse each pool in the oldest generation through the first links or age-ordered links. The generational garbage collector finds the youngest generation pool when it reaches the first pool that has a generation flag indicating the youngest generation. Thereafter, all pools may be considered in the youngest generation.

The last pool in the older generation has an age ordered link to the oldest pool in the youngest generation. As shown in FIG. 2, pool 6 has link 229 that connects pool 6 to pool 1 thereby linking the oldest generation with the youngest generation. A sequence of the pools in age order is as follows: pool 5, pool 8, pool 7, pool 6, pool 1, pool 2, pool 4, and pool 3. In this manner, a traversal starting at link 279 through the oldest generation pools leads to the pools in the youngest generation.

Similarly, the generations in the managed heap are linked in increasing address order. As shown in FIG. 2, starting from pointer 279, an increasing address order sequence of pools is as follows: pool 5, pool 6, pool 7, pool 8, pool 1, pool 2, pool 3, and pool 4.

A pool may have a fixed size, such as for example, 64 kilobytes (64 KB). Each pool also has a pool header that is located at the prescribed boundary. As shown in FIG. 2, pool 5, 226, has a pool header 250 that contains a generation flag 252 ('GEN FLAG'). The generation flag 252 indicates the generation of all the objects stored in pool 5, 226. A pool may store one or more objects that fit within the designated pool size. Pool 5, 226, shows an exemplary pool that stores N objects, where each object 254, 258, 262 is associated with Generation 1.

A pool may contain a large object whose size exceeds the pool size. As shown in FIG. 2, pool 8, 232, stores a large object, Object 3, 272, whose size exceeds the pool size. A pool is allocated to store the large object, Object 3, 272. The starting address of the pool is a multiple of the fixed pool size. Pool 8, 232, may be 128 Kbytes and contain a pool header 268 having a generation flag 270 ('GEN FLAG') that indicates that Object 3, 272, is associated with Generation 1.

The stack 126 may contain a root set 276. The root set, 276, may consist of a number of roots, Root 1, 278, through Root N, 280. A root is a reference to an object that is considered currently in use or deemed reachable, such as, global variables outside the managed heap, registers, and the call stack. A root is a starting point from which the generational garbage collector marks objects. As shown in FIG. 2, Root 1, 278, points to Object 2, 258, and Root N, 280, points to Object 1, 254.

An object is a unit of data that is dynamically allocated and may represent any type of data structure. In object-oriented programming languages and systems, an object may belong to a class that contains method code or other information shared by all objects belonging to the same class. An object may be identified by a reference that may be used to access the object.

The generational garbage collector 116 traverses each object reference to determine all the objects that are reachable from a root. An object is reachable when there is a path from a root to the object. An object may contain a large amount of references to other objects and these objects may in turn contain references to yet other objects. The generational garbage collector 116 traverses each object and all its references. When a path exists, the generational garbage collector 116 marks the object as being live. One way of marking an object may be to use a mark bit in the object's header. However, the generational garbage collector 116 may choose other ways to indicate that an object is marked. Objects that are not reachable from the root set are considered garbage and not marked.

Although the managed heap and pool layout shown in FIG. 2 has a limited number of elements in a certain configuration, it should be appreciated that the configuration of the managed heap and pools may include other configurations having more or less elements than what is shown in FIG. 2.

Figure 3:
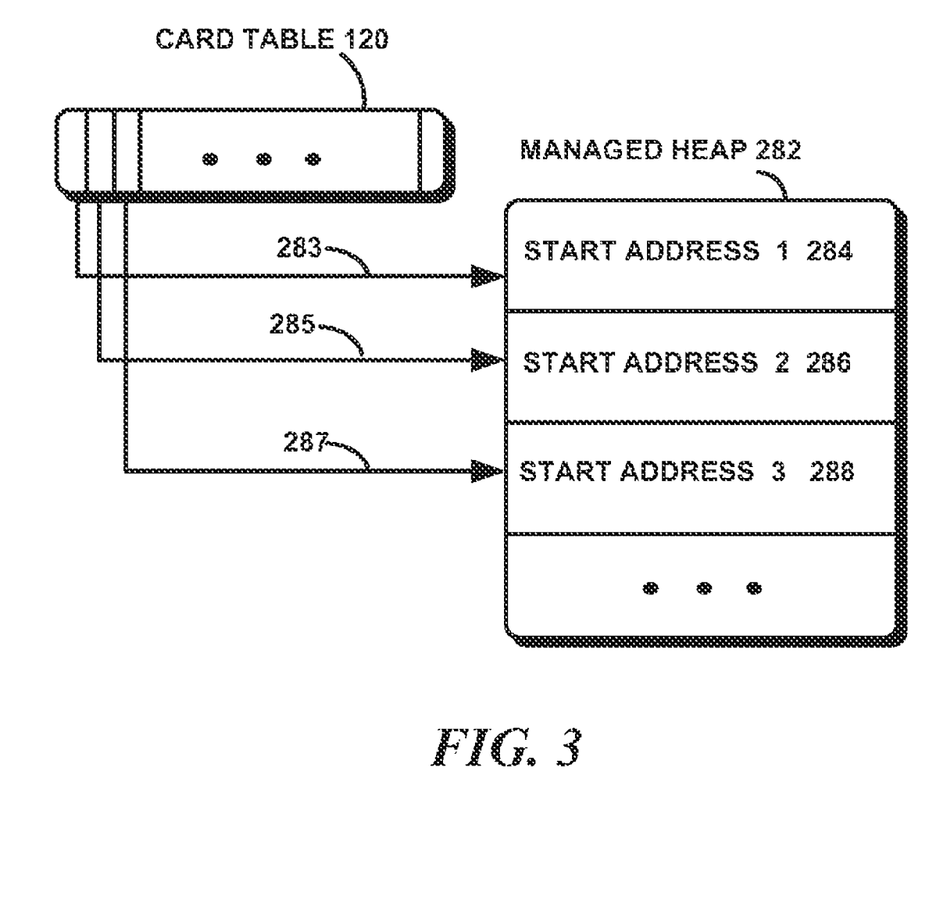
FIG. 3 is a block diagram illustrating an exemplary card table and an exemplary managed heap.

FIG. 3 illustrates an exemplary card table 120. A card table 120 is an array of bits where each bit is associated with a particular address range within the managed heap 282. As shown in FIG. 3, each bit in the card table 120 represents a starting address in the managed heap 282. For example, bit 283 is associated with start address 1 284. Start address 1, 284, may represent the starting address within the managed heap where an older generation object was updated via a write operation with a reference to a younger generation object. Likewise, bit 285 is associated with start address 2, 286, and bit 287 is associated with start address 3, 288.

The write barrier program 118 sets a card table bit when the memory location of an older generation object is updated with a reference to a younger generation object. In this manner, at a later point in time, the generational garbage collector 116 may use the card table 120 to find the younger generation object which it marks as being live.

Attention now turns to operations for the embodiments which may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 4:
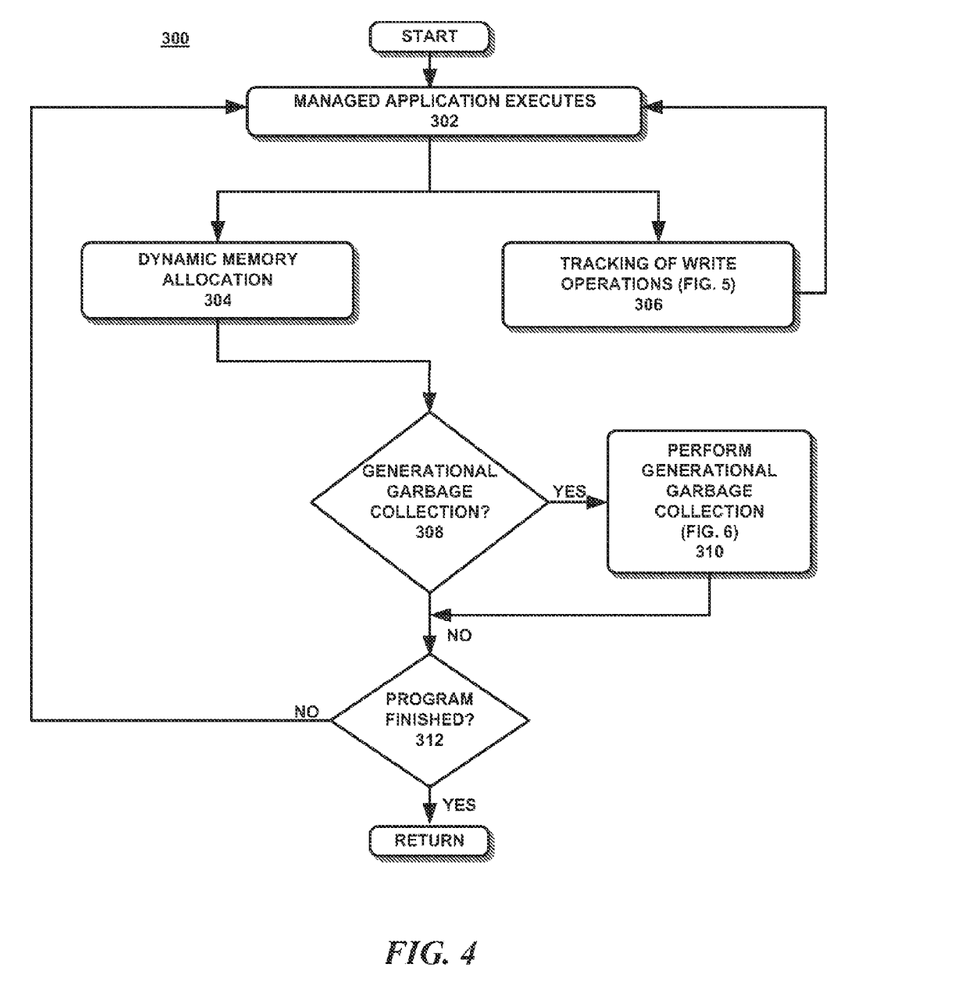
FIG. 4 is a flow diagram illustrating an exemplary operation of an application utilizing generational garbage collection.

FIG. 4 illustrates a flow diagram of an exemplary method 300 for performing generational garbage collection using a pool-based heap. It should be noted that the method 300 may be representative of some or all of the operations executed by one or more embodiments described herein and that the method can include more or less operations than that which is described in FIG. 4.

The process starts when a managed application 104 executes (block 302). During the course of the managed application's execution, instructions may be executed at runtime that request memory to be dynamically allocated for an object (block 304). Initially, the managed heap is empty. All memory allocations are associated with the youngest generation, Generation 0. When a memory allocation request is received, a 64 KB pool is allocated for the object. Additional memory allocation requests use this pool until the pool becomes full. At that point, another 64 KB pool is allocated. If a memory allocation request is received for an object that exceeds 64 KB, a dedicated pool is created to fit the size of the object. As additional pools are created, their respective links are updated to maintain the address ordered list and the age ordered list for the generation. It should be noted that the embodiments are not constrained to a 64 KB pool size and that any pool size may be used for a desired implementation.

During the execution of the managed application 104, write operations may be made to various memory locations within the managed heap. A write barrier 118 program may be used to track these memory writes (block 306). In particular, the write barrier program updates the card table with those memory locations associated with an older generation object having been modified with a reference to a younger generation object (block 306).

At various points within the execution of the managed application 104, garbage collection may be needed. Garbage collection may be initiated automatically upon the occurrence of predetermined events, such as when the operating system 110 realizes that the amount of free memory space is low. A full garbage collection pauses the execution of the managed application 104 and scans all generations of the managed heap for 'dead' objects. The full garbage collection may take an enormous amount of time. In some cases, a generational garbage collection may be used to quickly reclaim unused memory from the recently allocated objects. If a generational garbage collection is warranted (block 308—yes), then the generational garbage collection is performed (block 310). Otherwise (block 308—no), until the program finishes (block 312—yes), the managed application 104 continues to execute (block 312—no, block 302).

Figure 5:
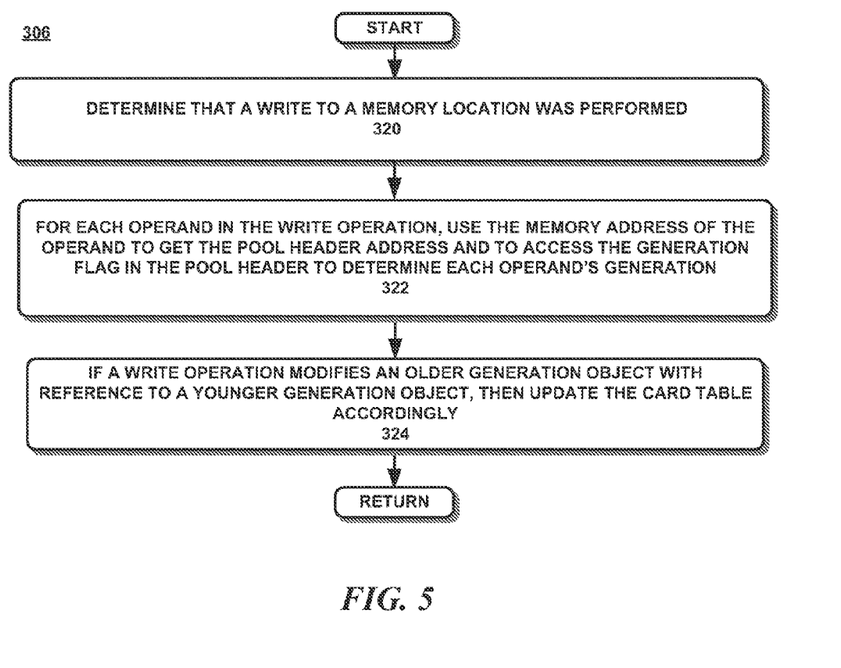
FIG. 5 is a flow diagram illustrating an exemplary operation of a write barrier program.

FIG. 5 illustrates a flow diagram of an exemplary method 306 for tracking write operations to objects in the managed heap. It should be noted that the method 306 may be representative of some or all of the operations executed by one or more embodiments described herein and that the method can include more or less operations than that which is described in FIG. 5.

Referring to FIG. 5, the write barrier 118 determines that a write operation was performed to a memory address within the managed heap (block 320). The write operation then determines whether the memory address modified by the write operation was associated with an object that was in an older generation and if it was updated with a reference to a younger generation object. Since each pool is aligned to a 64 KB boundary, the memory address of the pool header associated with an object may be determined by placing zeroes in the last 16 bits of the address. The generation flag associated with each pool header is then checked to determine an object's generation.

If the write barrier 118 determines that the write operation pertains to the situation where the memory address associated with an older generation was updated with a reference to a younger generation object, then the card table is updated accordingly (block 324). In particular, the bit in the card table that corresponds to the modified memory location may be set (block 324).

Figure 6:
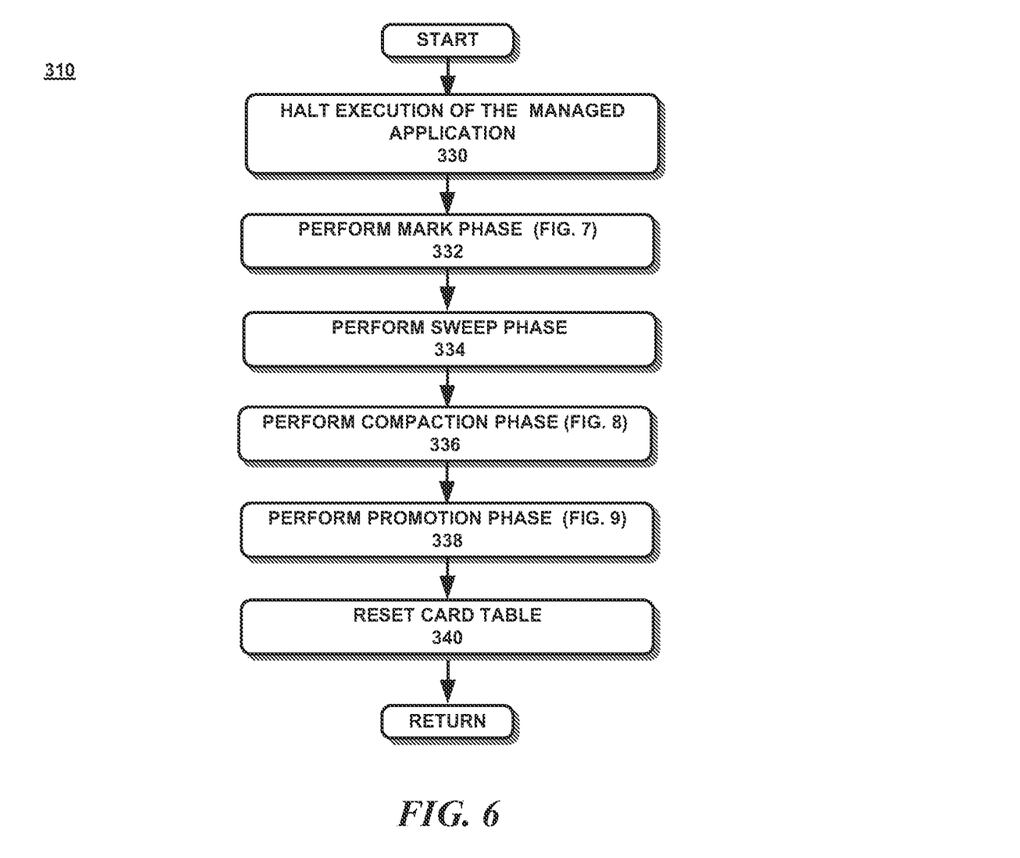
FIG. 6 is a flow diagram illustrating an exemplary method of a generational garbage collector.

FIG. 6 illustrates a flow diagram of an exemplary method 310 of a generational garbage collection. It should be noted that the method 310 may be representative of some or all of the operations executed by one or more embodiments described herein and that the method can include more or less operations than that which is described in FIG. 6.

Referring to FIG. 6, the generational garbage collector 116 may halt execution of a managed application 104 (block 330) and perform the mark phase. In the mark phase, the generational garbage collector 116 marks one or more of the youngest generations of the managed heap (block 332). Next, the sweep phase may be performed where the unmarked objects are placed in a free memory pool (block 334). The compaction phase may be performed where the live objects are coalesced to a designated area of the managed heap (block 336). The promotion phase is then performed where the younger generation objects surviving the collection are promoted to an older generation (block 338). Lastly, data structures used in the generational garbage collection are reset, such as the bits in the card table 120 (block 340).

Figure 7:
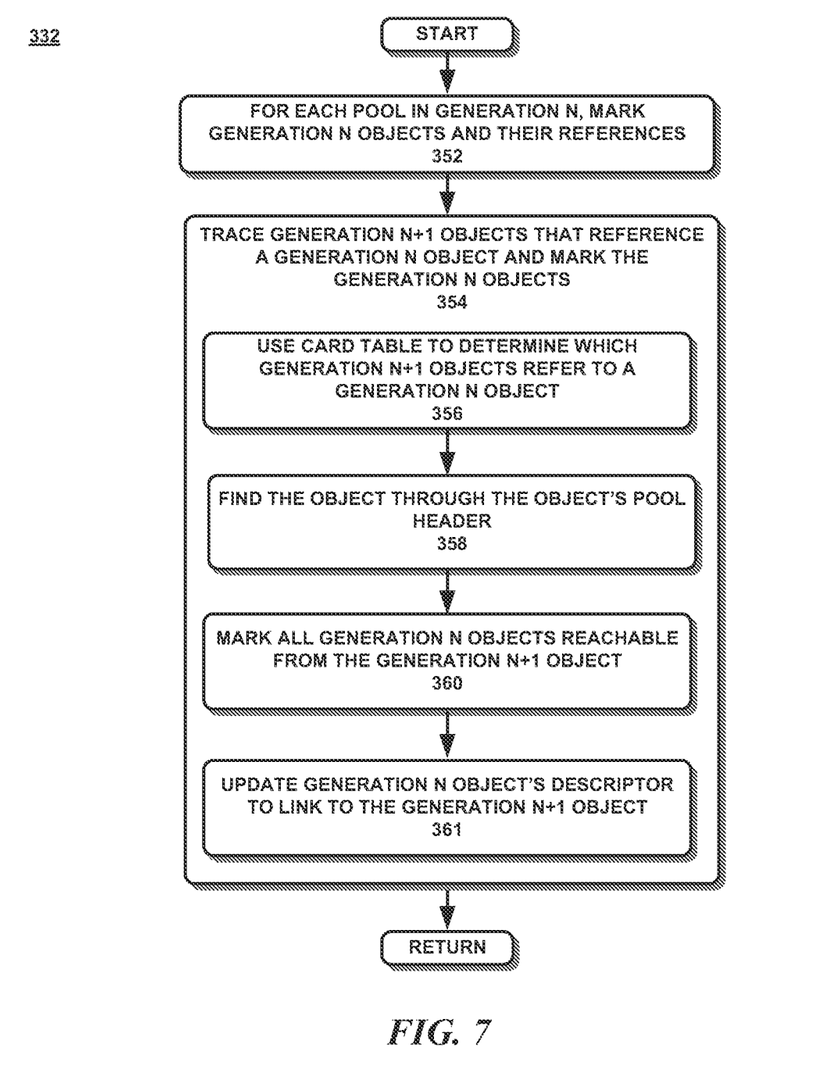
FIG. 7 is a flow diagram illustrating an exemplary mark phase of a generational garbage collection.

FIG. 7 illustrates a flow diagram of an exemplary method 332 of the mark phase. It should be noted that the method 332 may be representative of some or all of the operations executed by one or more embodiments described herein and that the method can include more or less operations than that which is described in FIG. 7.

Referring to FIG. 7, the generational garbage collector 118 proceeds by marking all objects with generation N and their references (block 352). The runtime virtual machine 112 may keep track of all the roots which the generational garbage collector 116 uses as a starting point to traverse the objects in generation N. The generational garbage collector 116 traverses each object reachable from the root set and all objects reachable from each object traversed. Each reachable object is marked, either using a bit in the object's header, by placing a reference to the object in a mark stack, or in any other manner.

Next, the generational garbage collector 116 traces all generation N+1 objects that reference a generation N object and marks the generation N object and all the references reachable from the generation N object (block 354). The card table 120 indicates the memory address range that must be scanned to find those objects in generation N+1 with references to objects in generation N (block 356). The generational garbage collector 116 finds the pool header of the object from the memory address associated with the card table 120. In the case of a 64 KB pool size, the last 16 bits of the memory address may be zeroed out to generate the pool header address. The generational garbage collector 116 then traces each object associated with the pool header through the address order link until the generation N+1 object is found (block 358). The generation N+1 object will have a reference to the generation N object and the generational garbage collector 116 marks the generation N object and all its references (block 360). The generation garbage collector 116 then updates the descriptor field in the generation N object to point to the generation N+1 object (block 361).

Figure 8:
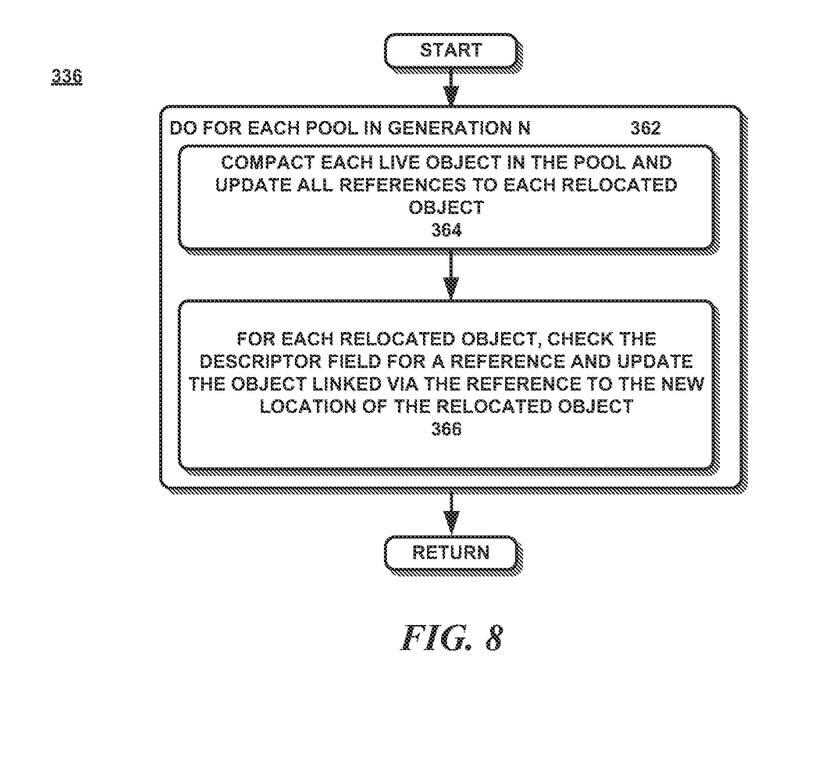
FIG. 8 is a flow diagram illustrating an exemplary compaction phase of a generational garbage collection.

FIG. 8 illustrates a flow diagram of an exemplary method 336 of the compaction phase. It should be noted that the method 336 may be representative of some or all of the operations executed by one or more embodiments described herein and that the method can include more or less operations than that which is described in FIG. 8.

In some embodiments, the compaction phase may not be performed at each execution of the generational garbage collector. In other embodiments, the compaction phase may be performed each time the generational garbage collector executes. In either event, the compaction phase traverses each pool in generation N (block 362) and compacts each live object in the pool to a designated area of the pool in order to eliminate fragmentation within the pool (block 364). The references to each relocated object are then updated to reflect the new location as well (block 364).

In addition, the descriptor field of each relocated object's header is checked (block 366). If the descriptor field contains a value, it may be assumed that the value is a pointer to an older generation object that references the relocated object. In this case, the older generation object's reference is updated to reflect the updated location (block 366).

Figure 9:
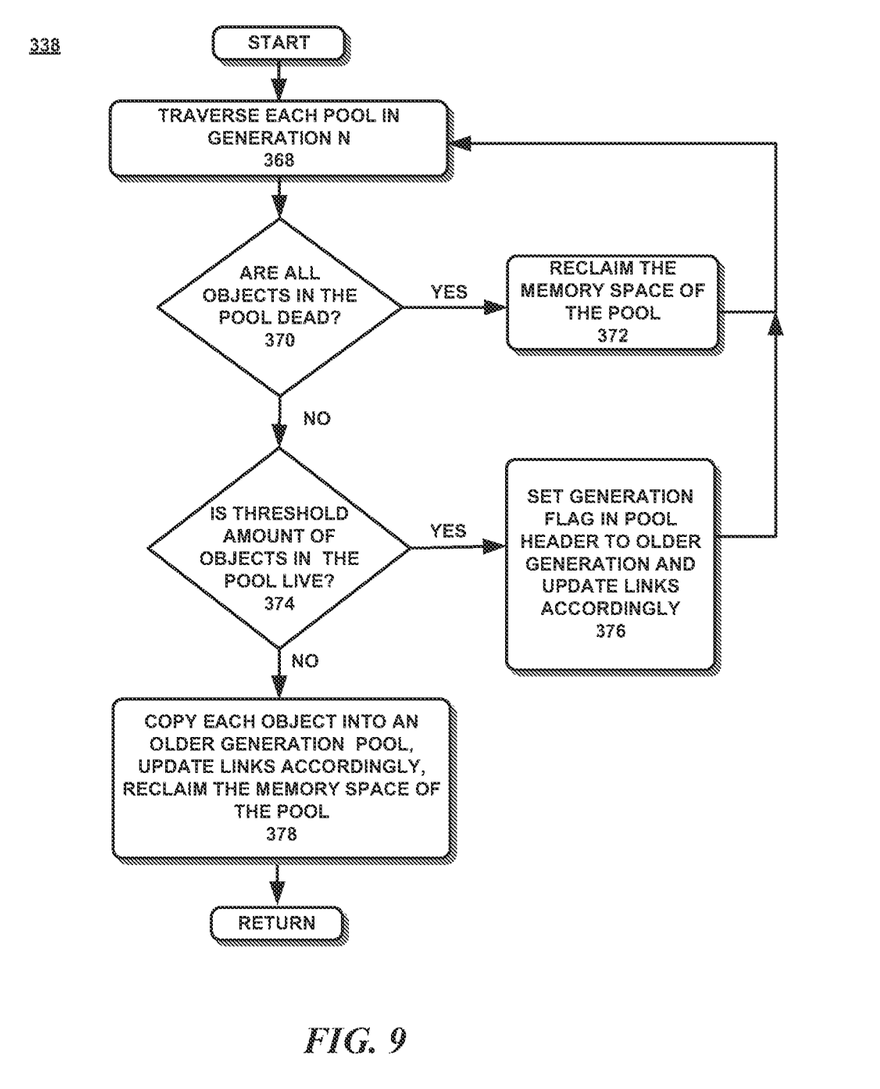
FIG. 9 is a flow diagram illustrating an exemplary promotion phase of a generational garbage collection.

FIG. 9 illustrates a flow diagram of an exemplary method 338 of the promotion phase. It should be noted that the method 338 may be representative of some or all of the operations executed by one or more embodiments described herein and that the method can include more or less operations than that which is described in FIG. 9.

At this point the generational garbage collector 116 has marked all generation N objects that are reachable, swept the unused memory space of the unreachable objects to a free memory pool, and may have compacted the managed heap. At this point, the promotion phase may be executed. In some embodiments, the promotion phase may be executed in accordance with the promotion policy of the generational garbage collector. For example, a promotion policy may require that the promotion phase be executed after every generational garbage collection or after $k_n$ collections of generation n, where k is a predetermined number.

The promotion phase may utilize a threshold to determine whether or not to promote an entire pool to the next oldest generation. For example, if a number of objects within a pool are still 'live' after a garbage collection, then the entire pool may be promoted to an older generation. A threshold may specify the number of 'live' objects within a pool that need to exist for the entire pool to be promoted. A pool not meeting the threshold number of live objects may have its objects copied out of the generation N pool and into a generation N+1 pool. In this manner, the promotion phase eliminates copying of objects out of a pool when the pool contains more live objects than unused memory space.

Referring to FIG. 9, the generational garbage collector 116 traverses each pool in generation N (block 368). If all objects in the pool are 'dead' (block 370—yes), then the memory space of the pool may be reclaimed (block 372). Otherwise (block 370—no), if a threshold number of objects in the pool are 'live' (block 374—yes), then the generation flag in the pool header is set to an older generation and the links are updated accordingly (block 376). Otherwise (block 374—no), each object in the pool is copied into an older generation pool and the pool's links are updated accordingly (block 378). The memory space of the pool is reclaimed as well (block 378).

Figure 10:
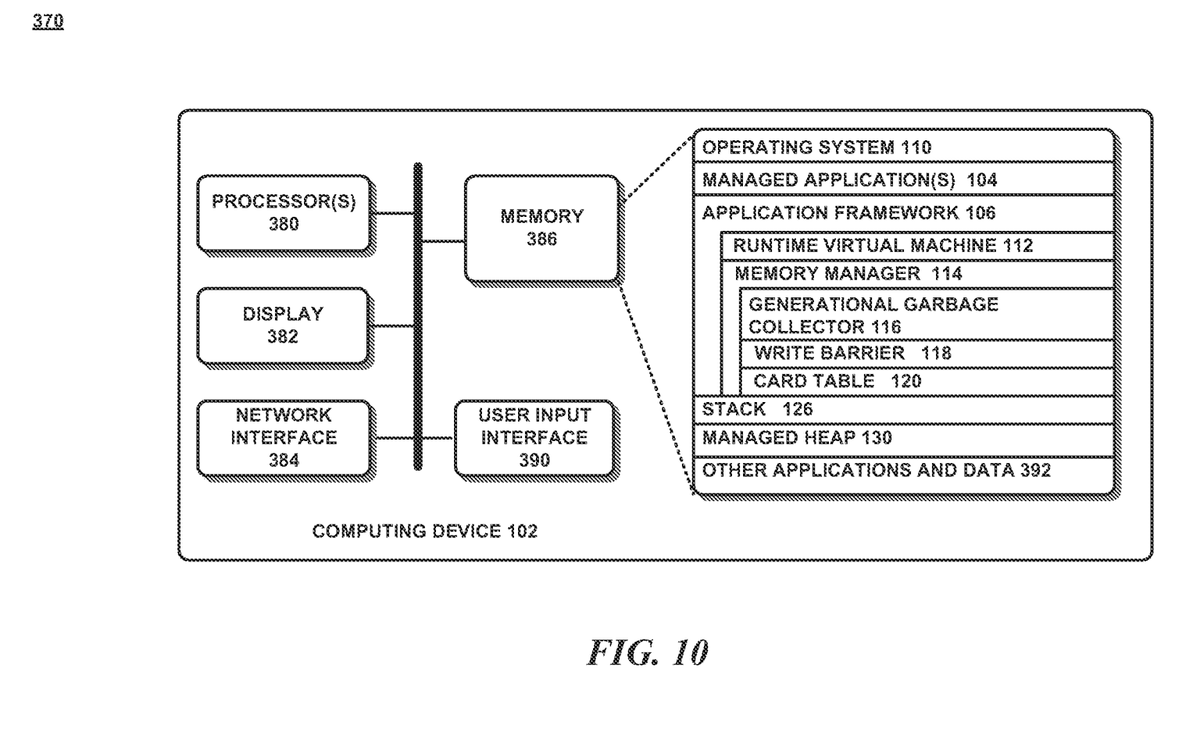
FIG. 10 is a block diagram illustrating an operating environment.

Attention now turns to a discussion of an exemplary operating environment. FIG. 10 illustrates an operating environment 370. It should be noted that the operating environment 370 is exemplary and is not intended to suggest any limitation as to the functionality of the embodiments. The embodiments may be applied to an operating environment 370 having a computing device 102 having access to remote or local storage devices.

The computing device 102 may be any type of electronic device capable of executing programmable instructions such as, without limitation, a mobile device, a personal digital assistant, a mobile computing device, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof.

The computing device 102 may have one or more processors 380, a display 382, a network interface 384, a memory 386, and a user input interface 390. A processor 380 may be any commercially available processor and may include dual microprocessors and multiprocessor architectures. The display 382 may be any type of visual display unit. The network interface 384 facilitates wired or wireless communications between the computing device 120 and a communications framework. The user input interface 390 facilitates communications between the computing device 120 and input devices, such as a keyboard, mouse, etc.

The memory 386 may be any computer-readable storage media that may store executable procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and the like. The memory 386 may also include one or more external storage devices or remotely located storage devices. The memory may 386 contain instructions and data as follows:

an operating system 110;
one or more managed applications 104;
an application framework 106 having a runtime virtual machine 112 and a memory manager 114, the memory manager 114 having a generational garbage collector 116, a write barrier 118, and a card table 120;
a stack 126;
a managed heap 130 having two or more generations; and
various other applications and data 392.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as programs, procedures, module, applications, code segments, program stacks, middleware, firmware, methods, routines, and so on. In an embodiment, for example, a computer-readable storage medium may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

What is claimed is:

1. A method implemented by a computer having at least one processor, the method comprising:
during execution of an application, allocating one or more pools in a memory, each pool aligned at a memory address that is a multiple of a pool size, each pool used to store one or more objects generated at runtime by the application, each pool having a generation flag set to a first generation;
marking objects stored in pools associated with the first generation deemed to be in use as live;
determining that a threshold number of objects within a first pool associated with the first generation are deemed live; and
promoting the live objects within the first pool first to the second generation by altering the generation flag of the first pool to a second generation.

2. The computer-implemented method of claim 1, comprising:
copying objects within the first pool into one or more other pools associated with the second generation when a number of objects within the second pool does not meet a threshold.

3. The computer-implemented method of claim 1, comprising:
tracking, during execution of the application, a starting address of a memory range having a first object associated with the second generation that references a second object in the first generation.

4. The computer-implemented method of claim 3, the marking step further comprising:
tracing the first object to find the second object;
marking the second object as being live; and
providing in the second object a reference to the first object.

5. The computer-implemented method of claim 4, further comprising:
using the starting address of the memory range to formulate a memory address of a select pool associated with the first object; and
searching the select pool for the first object.

6. The computer-implemented method of claim 4, further comprising:
reclaiming memory space used by unused objects in each pool associated with the first generation;
relocating the second object to a different memory location; and
using the reference in the second object to update the first object with a reference to the different memory location.

7. The computer-implemented method of claim 3, further comprising:
accessing a first select pool associated with the first object by formulating a memory address of the first select pool using select portions of the memory address of the first object;

determining that the first object is associated with the second generation;

accessing a second select pool associated with the second object by formulating a memory address of the second select pool using select portions of the memory address of the second object; and determining that the second object is associated with the first generation.

8. The computer-implemented method of claim 1, wherein the pools are not allocated from a contiguous memory space.

9. A system, comprising:
at least one processor and a memory;
the memory including:
a heap including at a first generation heap and a second generation heap, the first generation heap including a plurality of pools, each pool storing one or more objects, each pool stored at a memory offset that is a multiple of a pool size, each pool having a pool header located at the memory offset and which contains a generation flag indicating a first generation, the second generation heap including a plurality of pools, each pool storing one or more objects, each pool in the second generation heap having a pool header located at a memory offset that is a multiple of the pool size and which contains a generation flag indicating a second generation, the first generation heap storing objects recently allocated; and
a generational garbage collector, including instructions that when executed on a processor, performs a garbage collection operation and upon completion of the garbage collection operation, alters the generation flag associated with the first pool based on each pool having a threshold amount of live objects remaining in the first pool and promotes the first pool in the first generation heap to the second generation.

10. The system of claim 9, wherein the memory further comprises:
a card table containing a plurality of bits, each bit representing a starting address of a memory range in the heap; and
a write barrier, having instructions that when executed on a processor,
tracks objects used in a write operation and determines a generation associated with each object by accessing a generation flag of a pool header associated with a pool storing an object, and
updates a select bit in the card table to indicate when a first object in the second generation heap references a second object in the first generation heap.

11. The system of claim 10, wherein the write barrier, has further instructions that when executed on a processor, forms a memory address of the pool header from the memory address of the first object and uses the memory address to obtain a generation associated with an object.

12. The system of claim 9, the generational garbage collector, including instructions that when executed on a processor,
scans the card table to find objects in the second generation heap that reference objects in the first generation heap and to mark the objects in the first generation heap as being live, and
places a descriptor reference to the object in the second generation heap in the object in the first generation heap.

13. The system of claim 12, the generational garbage collector, including instructions that when executed on a processor,
uses a descriptor reference to find the object in the second generation heap when the location of the object in the first generation heap is altered during compaction of the pool.

14. A computer-readable storage medium storing thereon processor-executable instructions, comprising:
a heap having a first generation heap and a second generation heap;
a generational garbage collector, having instructions that when executed on a processor,
receives a first request to allocate memory for an object at runtime from an application,
allocates a first generation pool associated with the first generation heap, the first generation pool used to store the object, the first generation pool aligned at a boundary that is a multiple of a fixed pool size, the first generation pool having a generation flag set to a first generation; and
a write barrier, having instructions that when executed on a processor,
tracks objects used in a write operation and determines a generation associated with each object by accessing a generation flag associated with a pool storing an object, and
updates a select bit in the card table to indicate when a first object in the second generation heap references a second object in the first generation heap, updates a select bit in the card table to represent a memory range storing the first object,
wherein the generational garbage collector promotes a pool in the first generation heap to the second generation heap when the pool has a threshold number of live objects.

15. The computer-readable storage medium of claim 14 wherein the generational garbage collector, has further instructions that when executed on a processor,
executes a mark phase that scans one or more select objects in the second generation heap for a reference from a select object to an object in the first generation heap,
marks the object in the first generation heap as live, and
places a descriptor reference to the select object in the object in the first generation heap.

16. The computer-readable storage medium of claim 15 wherein the generational garbage collector, has further instructions that when executed on a processor,
executes a compaction phase that relocates a live object from a pool in the first generation heap to a different memory location and uses the descriptor reference to update the select object with the different memory location.

17. The computer-readable storage medium of claim 15 wherein the generational garbage collector, has further instructions that when executed on a processor,
executes a promotion phase that promotes a pool in the first generation heap to the second generation heap by altering the generation flag of the pool to the second generation.

* * * * *